No. 686,134. Patented Nov. 5, 1901.
U. G. ROGERS.
LATHE TOOL.
(Application filed Apr. 11, 1901.)
(No Model.)
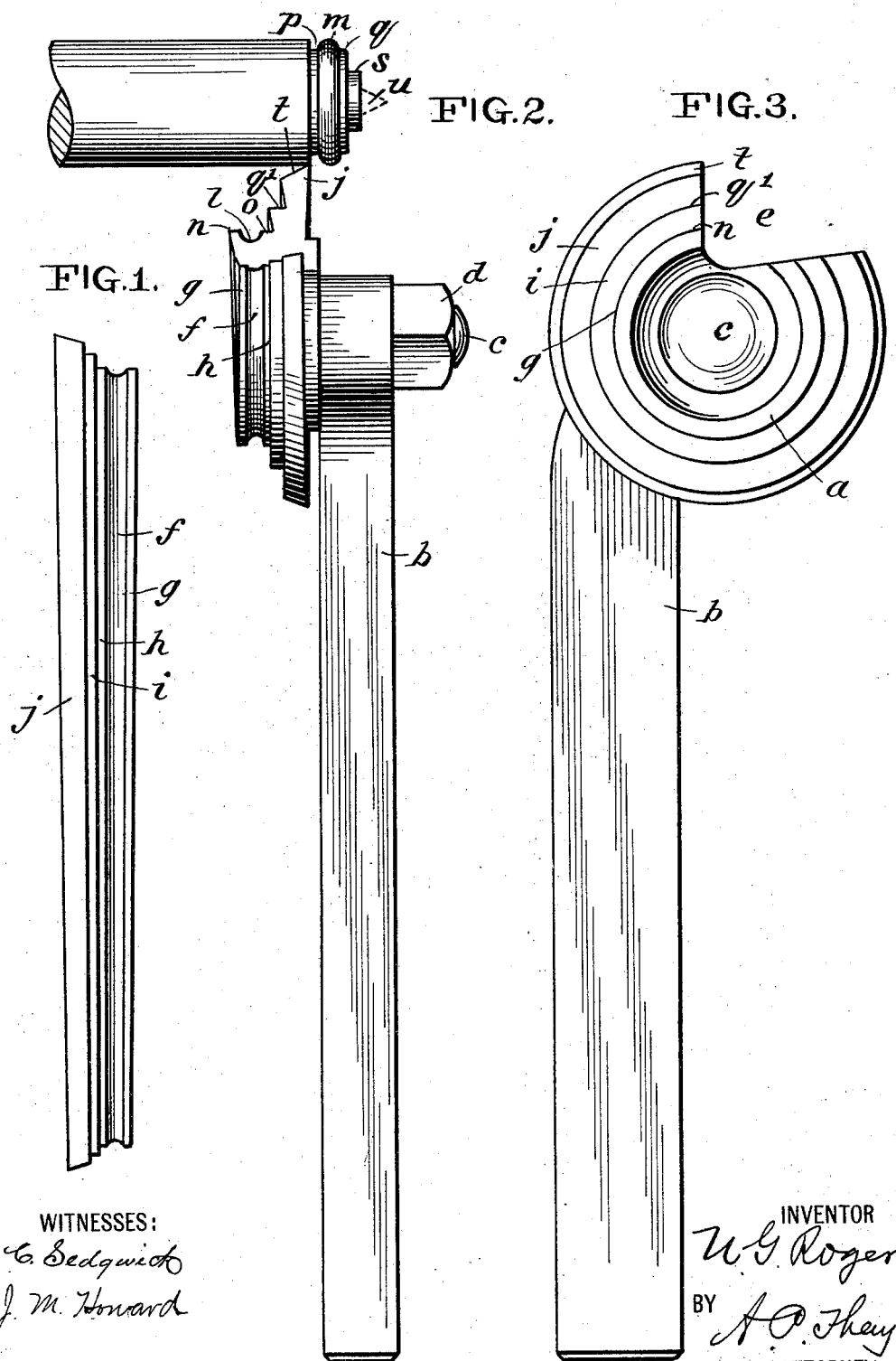
WITNESSES:
C. Sedgwick
J. M. Howard
INVENTOR
U. G. Rogers
BY
A. P. Thayer
ATTORNEY

UNITED STATES PATENT OFFICE.

ULYSSES G. ROGERS, OF NEW YORK, N. Y.

LATHE-TOOL.

SPECIFICATION forming part of Letters Patent No. 686,134, dated November 5, 1901.

Application filed April 11, 1901. Serial No. 55,339. (No model.)

*To all whom it may concern:*

Be it known that I, ULYSSES G. ROGERS, a citizen of the United States of America, and a resident of New York city, county and State of New York, have invented certain new and useful Improvements in Lathe-Tools, of which the following is a specification.

My invention consists of a lathe-tool of perpetual uniform contour of the cutting edge constructed for simultaneously forming or shaping a nut, screw-head, or other article having a plurality of faces and cutting off an otherwise-completed nut or other article and whereby there is economy of time and labor in shaping small circular thumb-nuts and other such articles of the character commonly used in telegraph instruments, the said tool being constructed with radial side clearance of the different salient parts, as hereinafter described, reference being made to the accompanying drawings, in which—

Figure 1 is a diagram of the face of my improved lathe-tool laid out flat. Fig. 2 is a top view of the tool and its holder with a piece of work in juxtaposition therewith, illustrating the operation. Fig. 3 is a side elevation of the tool and holder.

In constructing the tool I first prepare a suitable disk $a$, of steel, having a central bore for securing it to a holding-stock $b$ by a bolt $c$ and nut $d$, and notch the same radially, as at $e$, for producing the cutting edges. On the face of this disk I produce the groove $f$ intermediate of two plain rim-faces $g$ and $h$, with the radially-larger plain rim-face $i$ next to $h$, and lastly the larger flange $j$, the face of said flange being beveled expandingly away from rim-face $i$. In Fig. 2 it will be seen that the flange $j$ and rims $i$ and $g$ are slightly undercut radially for radial clearance, and in Fig. 1 it is also to be seen that these elements taper slightly from the leading side of the notch $e$ to the following side for circumferential clearance of the sides. By this construction of the tool there is produced a grooved cutting edge $l$ for shaping the large rim $m$ of the nut, two plain cutters $n$ $o$ for producing the plain faces $p$ $q$ of the nut on opposite sides of the rim $m$, respectively, and of smaller diameter than said rim, another plain cutter $q'$ for producing the plain face $s$ outside of face $q$, and the cutting-off cutter $t$ for separating the finished nut.

It is to be noted that the bevel-cutter $t$ is in such relation to the rest that it reduces the metal cut away in separating the nuts in taper form and separates the nuts at the points of the tapers in a way to effect the separation smoothly close to the nuts, while the rest of the portion being cut away is of larger and firmer resisting capacity. The dotted point $u$ in Fig. 2 indicates what is meant by the taper form of the metal cut away in separating the nut, whereby the separation takes place in the plane of the side of the nut, which makes clearer cuts than if the face of cutter $t$ were parallel to the axis of the disk. The separation of the part $u$ follows directly after the nut is separated.

The cutting edges are sharpened by grinding the face of the notch $e$, whereon the several cutting edges are produced.

The contour of the face of the disk cutter may of course be modified, as it may be desired to modify the faces of the nuts or other articles.

What I claim as my invention is—

In a radially-notched disk lathe-tool having a plurality of circumferential rim or flange cutters, the salient parts of said cutters, having besides the usual circumferential clearance extending from point to heel of each, radial undercut or reëntering side clearances.

Signed at New York city this 9th day of April, 1901.

ULYSSES G. ROGERS.

Witnesses:
 C. SEDGWICK,
 A. P. THAYER.